United States Patent [19]

Sundberg

[11] 4,236,247
[45] Nov. 25, 1980

[54] APPARATUS FOR CORRECTING MULTIPLE ERRORS IN DATA WORDS READ FROM A MEMORY

[75] Inventor: Carl-Erik Sundberg, Lund, Sweden

[73] Assignee: Organisation Européene de Recherches Spatiales, Paris, France

[21] Appl. No.: 3,730

[22] Filed: Jan. 15, 1979

Related U.S. Application Data

[63] Continuation-in-part of Ser. No. 857,974, Dec. 6, 1977, abandoned.

[51] Int. Cl.³ .................... G06F 11/10; G11C 29/00
[52] U.S. Cl. .................................................. 371/38
[58] Field of Search .............. 235/312; 340/146.1 AL; 371/38, 37

[56] References Cited

U.S. PATENT DOCUMENTS

| | | | |
|---|---|---|---|
| 3,755,779 | 8/1973 | Price | 235/312 |
| 3,949,208 | 4/1976 | Carter | 235/312 |
| 4,030,067 | 6/1977 | Howell et al. | 340/146.1 AL |
| 4,072,853 | 2/1978 | Barlow et al. | 235/312 |
| 4,077,028 | 2/1978 | Lui et al. | 340/146.1 AL |
| 4,117,458 | 9/1978 | Burghard et al. | 340/145.1 AL |
| 4,168,486 | 9/1979 | Legory | 340/146.1 AL |

OTHER PUBLICATIONS

Hsiao, A Class of Optimal Minimum Odd-Weight--Column SEC-DED Codes, IBM J. Res. Develop., Jul. 1970, 395-401.

*Primary Examiner*—Charles E. Atkinson
*Attorney, Agent, or Firm*—Hill, Van Santen, Steadman, Chiara & Simpson

[57] ABSTRACT

An apparatus for a semiconductor memory in a data processing system, which performs real-time single and double error detection and correction, as well as triple error detection. The syndrome of the data word read from the memory is stored when a first error is detected. Said stored syndrome is used later for error correction when a second error is detected and in parallel it is combined logically with the actual syndrome word for deriving the syndrome corresponding to the second error, said second syndrome serving for error correction. The second syndrome can also be stored for permitting real-time triple error detection.

3 Claims, 3 Drawing Figures

APPARATUS FOR CORRECTING MULTIPLE ERRORS IN DATA WORDS READ FROM A MEMORY

BACKGROUND OF THE INVENTION

This is a continuation-in-part of application Ser. No. 857,974, filed Dec. 6, 1977 and now abandoned.

The present invention relates to an apparatus for detecting and correcting on a real time basis multiple errors which occur in codewords read from a semiconductor memory in a data processing system.

It is of common practice in the field of data processing systems to store the data bit words together with a number of check bits in the form of so-called error detecting and correcting codewords. When read from the memory these codewords are decoded and the same check bits are then read from the memory via a decoder in which they are used for checking whether errors have occurred in the data words which are read out. The codewords containing N bits comprised of L data bits and (N-L) check bits are designated as (N-L) codes. One class of familiar codes are the so-called single error correction, double error detection Hamming codes containing 16 data bits and 6 check bits. The number of check bits may also be 7 or 8 for instance.

Different systems are known in the art for detecting and correcting the errors occurring in the codewords read from a computer memory. A first group of systems use a test word for locating the error in the word read from the memory. In such systems, means are provided to detect the occurrence of a fault and to stop the computer operation for allowing a test routine to be initiated with a view to locate the fault by using a fault location word. When the fault has been located, it is corrected in the word read from the memory and the corrected word is then allowed to be transmitted. Using error detecting system of this type results in the computer system being stopped each time a fault is detected: this is detrimental to the operation speed and the efficiency of the computer system.

To obviate these drawbacks, systems of a second group have been designed for automatically detecting and correcting the faults without the computer system having to be stopped. These systems comprise a network of EXCLUSIVE-OR gates interconnected for producing a bit vector called syndrome for each word which is read from the memory. The syndrome is then used to automatically locate and correct errors occurring in the words read from the memory. These systems use a single error correction scheme which is capable of correcting one error at a time. None of them achieve the real time correction of double permanent errors due to hardware failure in the memory cells. At this point it should be pointed out that most of the failure modes of semiconductor random access memories result in the data output being stuck at a particular value, binary one or binary zero. This may be true for all the memory cells or it may be confined to certain location(s) within the memory. Such double errors cannot be corrected by using the known systems and therefore all these systems have in common that they do not achieve sufficient reliability for large capacity memories or special memory applications such as real time on-board computer systems for long duration spaceborne missions, for example.

SUMMARY OF THE INVENTION

An object of this invention is to provide an automatic multiple error correction apparatus for use in semiconductor memories for improving substantially the reliability thereof without the expense of increasing the number of parity check symbols or the hardware complexity.

Another object of the invention is to provide a simple apparatus for automatically correcting on a real time basis double permanent errors occurring in any codeword having a Hamming distance $d=4$, except those which occur simultaneously.

In accordance with the instant invention, as soon as an error is detected in a codeword read from a memory block, the error syndrome is stored for later use while this first error is located for automatic correction. Some time later, when a second error is detected in the same codeword, the stored error syndrome is selected for being corrected as an erasure, that is an error with known location. It is easier for the decoder to correct an erasure than a random error. In parallel, the selected stored error syndrome is subtracted from the actual syndrome word from the syndrome generator for deriving the syndrome corresponding to the second error and this second error syndrome is used for correcting the second error in the conventional manner.

Yet another object of the invention is an apparatus which, while being capable of correcting double permanent errors, is also capable of detecting a triple error occurring in a codeword by storing the second error syndrome and performing additional logic combination of the syndromes.

DESCRIPTION OF THE INVENTION

Figure 1:
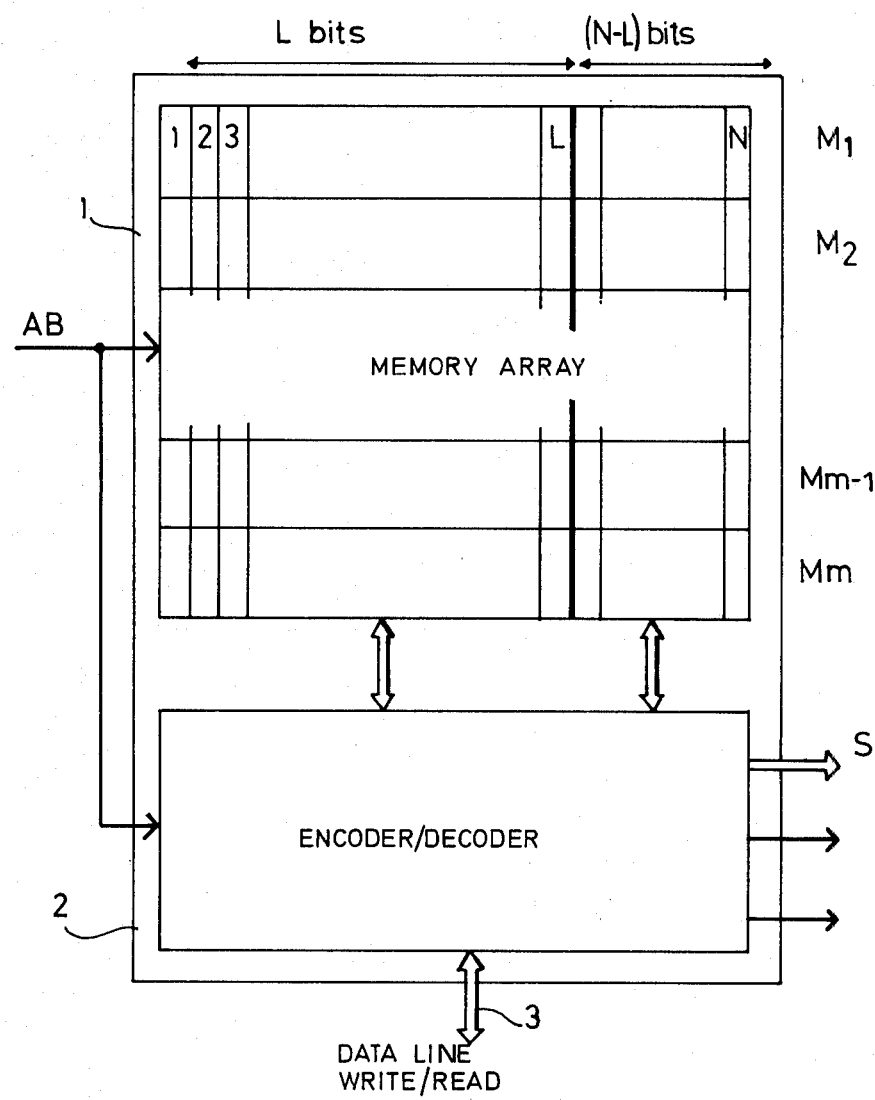
FIG. 1 is a block diagram of a semiconductor memory unit with the associated encoder/decoder unit including the error detection and correction apparatus.

Referring to FIG. 1, there is shown schematically a memory 1 subdivided as usual into a number of locations or memory blocks M1, M2, ... Mm. Each memory block has a length of N bits adapted to store codewords containing L data bits and (N-L) check bits. The data are read into and from the memory unit 1 through the encoder/decoder unit 2. The encoder portion of unit 2 is operative to generate the codewords Y which are read into the memory blocks M through lines 20. On a reading operation, the codewords Y are read out through the decoder apparatus contained in unit 2 with the purpose of automatically detecting and correcting the possible errors in the codewords. In the instant invention the decoder apparatus is operative to detect and correct multiple errors on a real time basis as will be seen hereafter.

Figure 2:
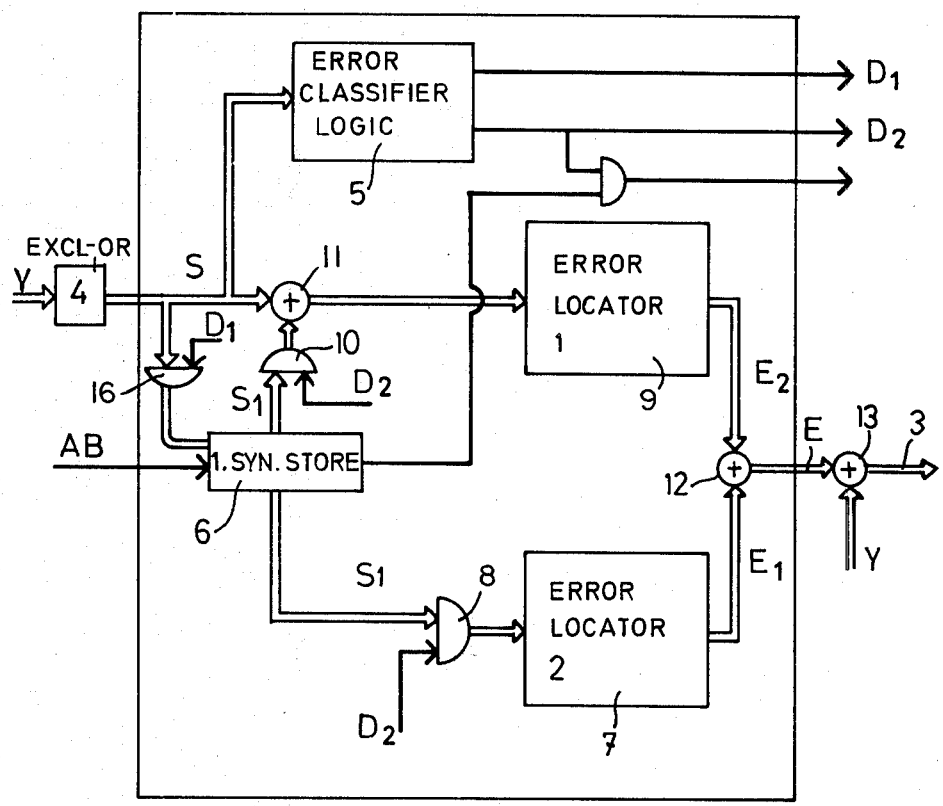
FIG. 2 is a schematic diagram of the error detection and correction apparatus according to the invention for correcting a double error in a codeword.

FIG. 2 shows a schematic drawing of the decoder apparatus 2. Each word Y is fed into the syndrome generator 4 which comprises a network of EXCLUSIVE-OR gates interconnected in a manner known per se for generating the error syndrome S of the codeword Y. The error syndrome S, as is known in the art, is the product of the word Y and the parity check matrix H for the used code. The matrix H, it is well known, comprises (N-L) lines × N columns. The syndrome S can be expressed by relation:

$$S = Y \cdot H.$$

The syndrome S comprises (N-L) bits.

The network 4 is an arrangement well known in the art for performing bit by bit modulo-2 additions of the codewords Y and the matrix H. The coding theory teaches that when the word Y is a true code, the syndrome S thereof has a zero value, i.e. it contains all 0 bits, and when the word Y contains at least one erroneous bit, the syndrome S has a non-zero value and contains one bit 1. The syndrome S has an odd parity when word Y contains a single error and an even parity (not zero) when the word Y has a double error.

The error classifier means 5 is a conventional logic, known per se, having the function of checking the syndrome word S for a non-zero value and determining its parity. When an odd parity is detected, the logic 5 generates the first signal D1 and when an even parity is detected, the logic 5 generates a second signal D2. The signals D1 and D2 are used to determine the correction mode.

The EXCLUSIVE-OR gate 9 accepts as a first input the syndrome word S and transfers it to the error locator 8 which is an arrangement known per se operative to decode the syndrome word for generating an error word to be used in a known manner for correcting the possible error identified by the syndrome word applied thereto. The gate 9 has a second input to accept a stored syndrome as will be explained hereafter and to combine it with the syndrome word S applied to its first input.

The syndrome store 6 comprises a set of registers, each associated with a respective memory block and having (N-L) stages for being capable of storing the syndrome word S when an error is detected in the codeword Y. For each codeword, the appropriate register is selected by means of a respective select signal AB. The appropriate register in the syndrome store 6 is loaded with the syndrome word S through AND-gate 11 which is enabled in response to the occurrence of detect signal D1 indicating a single or first error. The stored syndrome corresponds to that first error and will be denoted S1. It will serve at a later stage as will be seen hereafter. In parallel with this procedure of syndrome storing, the syndrome word from network 4 is coupled through gate 9 to the error locator 8.

When, some time later, a second error occurs in the same codeword Y read from the memory, the syndrome word S from the syndrome generator 4 is the exclusive-OR function of the two individual error syndromes corresponding to the succeeding first and second erroneous bits in the codeword Y, and this syndrome word has now an even parity. This parity is detected by the error logic 5 which generates the detect signal D2. The latter enables AND-gate 14, whereby the stored error syndrome S1 is applied to the error locator 7 where it is decoded in the known manner to generate the error word E1 locating the first error. This known error (erasure) can then be corrected easily.

In parallel with this correction procedure, the stored error syndrome S1 from the store 6 is gated through AND-gate 10, which is enabled by the detect signal D2, to a first input of the EXCLUSIVE-OR gate 9. The latter is then operative to subtract the stored error syndrome S1 from the syndrome word S, thereby to produce the error syndrome corresponding to the second error to occur. This second syndrome, which will be denoted S2, is applied to the error locator 8 where it is decoded as described earlier to generate the error word E2.

The error words, as is well known, contain each a "1" in each correct bit position and a "0" in an error bit position. These error words E1 and E2 are logically combined in EXCLUSIVE-OR gate 12 which is operative to produce an error word E that is the modulo-2 addition of E1 and E2. The error word E is applied to EXCLUSIVE-OR gate 13 for being added to the codeword Y. All the data bits are inverted, except the particular bits in error, thereby correcting the sense of the bits in error. The corrected word is then transmitted on data line 3.

Thus, it is clearly apparent from the foregoing that under double error condition, the syndrome identifying the first error is read into the syndrome store 6 and in parallel with this storing process, that first error syndrome S1 appears at the output of gate 9. Some time later, when the second error is detected, the stored syndrome S1 is selected to be gated into the error locator 7 which is operative to locate the first bit in error for correction. In parallel, the selected stored syndrome S1 is gated to EXCLUSIVE-OR gate 9 where it is subtracted from the actual syndrome word at that time (which is the modulo-2 sum of the individual syndromes corresponding to the first and second errors respectively) for deriving the second syndrome S2 which identifies the second error and said second error syndrome S2 is applied to the error locator 8 which is operative to locate the second bit in error for correction. A double error correction is thereby performed on a real time basis without any interruption in the data transmission on the data line.

Under no-double error condition (that is no error or single error), the syndrome at the output of EXCLUSIVE-OR gate 9 is identical to the syndrome word from the syndrome generator 4. In case of single error, the error syndrome S1 is read into the syndrome store 6 for later use when a second error is detected.

Figure 3:
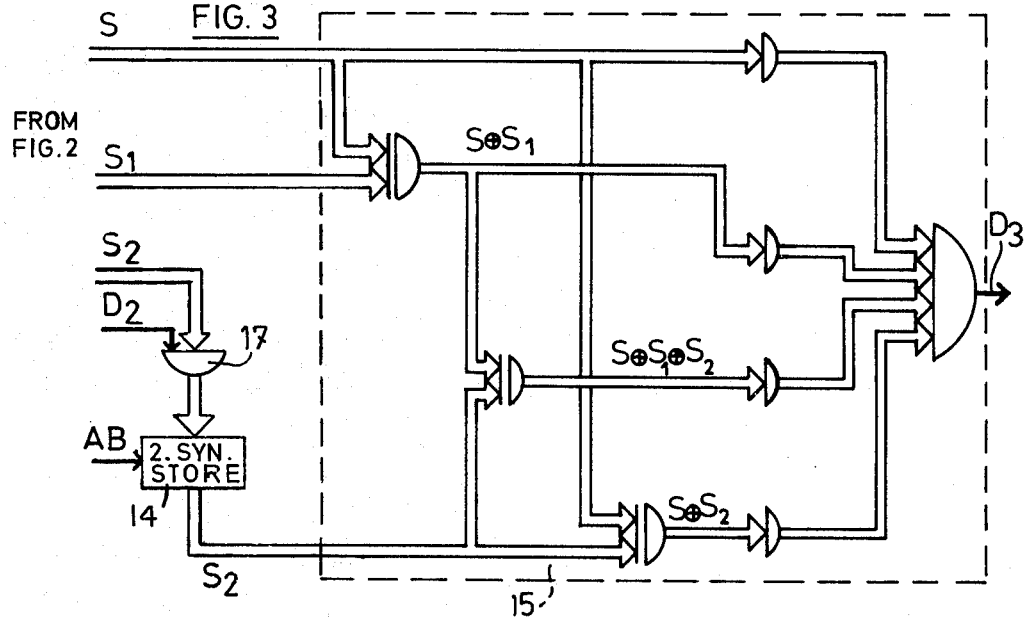
FIG. 3 is a schematic diagram of additional means for the apparatus of FIG. 2 for detecting a triple error in a codeword.

The apparatus according to the invention not only permits double errors to be corrected but also it can be easily adapted for detecting a triple error in a codeword. Only the position of the second error has to be determined therefor. For that purpose, a second syndrome store needs to be provided for storing the error syndrome S2 which corresponds to the second error. FIG. 3 shows a schematic diagram of the additional arrangement to be associated with the apparatus of FIG. 2 for the latter being capable of detecting a triple error.

The second syndrome store 16 is similar to the syndrome store 6. The second error syndrome S2 is read into the syndrome store 16 through gate 17 which is enabled by the detect signal D2. The logic arrangement 15 is connected as will be readily apparent to one skilled in the art for being operative to logically combine with each other the syndrome word S from the syndrome generator 4, the first stored error syndrome S1 and the second stored error syndrome S2 and for producing a detect signal D3 in response to the following logic conditions being met:

$S \neq 0$
$S \oplus S1 \neq 0$
$S \oplus S2 \neq 0$

S⊕S1⊕S2≠0

The signal D3 represents the occurrence of a triple error in the codeword read from a memory block. The logic arrangement 15 can be similar to the known error logic means used for detecting single and double errors.

The apparatus according to the invention permits double errors to be corrected in the codewords which are stored not only in (22,16) Hamming codes but also in any code having a minimum Hamming distance d=4, e.g. (72,64) codes.

Tests have shown that the reliability of a semiconductor memory used with an apparatus according to this invention in terms of failure rate of the memory cells and in terms of working time is substantially improved as compared with the usual reliability of known systems using an apparatus capable of correcting single errors only.

It is to be understood that the logic arrangements can be realized in various equivalent embodiments well known to those skilled in the art by using interconnected conventional logic circuits and/or integrated circuit units with a view to perform the required logic functions as stated in the foregoing.

What is claimed is:

1. An apparatus for detecting and correcting multiple errors in a codeword read from a memory, comprising:
   first circuit means for accepting the codeword from the memory and generating the syndrome word of said codeword;
   second circuit means for checking the value of the syndrome word from the syndrome generating means and detecting the occurrence of a no-double error or a double error condition in the codeword;
   syndrome store means connected for storing the syndrome word from the syndrome generating means in response to the occurrence of a no-double error condition;
   third circuit means coupled to the output of the syndrome generating means and being operative to transfer said syndrome word in response to a no-double error condition, said third circuit means being further operative to combine said syndrome word with the stored error syndrome from the syndrome store in response to a double error condition for generating a second error syndrome;
   first error correction means in electrical communication with the output of said third circuit means and the input to said first circuit means for providing an error correction in response to the detection of a single error in the codeword or providing an error correction for the second error to occur in the codeword in response to the detection of a double error condition;
   fourth circuit means in electrical communication with said syndrome store to select said stored syndrome word in response to a double error condition;
   second error correction means in electrical communication with said fourth circuit means and the input to said first circuit means for providing an error correction for the first error to occur in the codeword in response to the detection of a double error condition.

2. An apparatus for detecting and correcting multiple errors in a codeword read out from any location in a memory, comprising:
   syndrome generator means connected for accepting the codeword from the memory and generating the error syndrome of said codeword;
   means for checking the value of the syndrome word and producing a first detect signal in response to the syndrome indicating a no-double error condition and producing a second detect signal in response to the syndrome indicating a double error condition;
   syndrome store means comprising a set of register means, each associated with a respective memory location and capable of storing the syndrome word corresponding to the codeword read from a particular memory location;
   first gate means having an input connected to the output of the syndrome generator means and being responsive to said first detect signal for reading the syndrome word into the syndrome store means;
   second gate means having a first input connected to accept the syndrome word from the syndrome generator means, a second input connected to accept the stored error syndrome from said syndrome store means, and a control input for accepting said second detect signal, said second gate means being operative to transfer the syndrome word from the syndrome generator means in response to the occurrence of a no-double error condition, and said second gate means being further operative to accept the stored error syndrome from said syndrome store means in response to said second detect signal being applied to the control input, thereby to logically combine the said syndrome word from the syndrome generator means with the said stored error syndrome for deriving the syndrome corresponding to a second error which has occurred in the codeword read from the memory;
   first error correction means in electrical communication with said second gate means and the input to said syndrome generator means for providing an error correction in response to the detection of a single error in the codeword or providing an error correction for the second error to occur in the codeword in response to the detection of a double error condition;
   third gate means having an input connected to accept the output from said syndrome store means, said third gate means being responsive to said second detect signal for selecting the stored error syndrome;
   second error correction means in electrical communication with said third gate means and the input to said syndrome generator means for providing an error correction for the first error to occur in the codeword in response to the detection of a double error condition.

3. An apparatus according to claim 2 further comprising:
   second syndrome store means comprising a set of register means, each associated with a respective memory location and capable of storing the syndrome corresponding to the codeword read from said memory location;
   fourth gate means having an input connected to the output from said first gate means and being operative to read the error syndrome from said first gate means into the second syndrome store means in response to said second detect signal;
   logic means connected to accept the syndrome word from the syndrome generator means, the stored error syndrome from said first syndrome store means and the stored error syndrome from said second syndrome store means, said logic means being operative to produce a signal indicating the occurrence of a triple error in the codeword read from the memory.

* * * * *